United States Patent
Eo

(10) Patent No.: US 6,354,416 B1
(45) Date of Patent: Mar. 12, 2002

(54) SYNCHRONIZER FOR MANUAL TRANSMISSION

(75) Inventor: Soon-Gi Eo, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/573,134

(22) Filed: May 17, 2000

(30) Foreign Application Priority Data

Dec. 15, 1999 (KR) .............................................. 99-57981

(51) Int. Cl.$^7$ .............................................. F16D 23/06
(52) U.S. Cl. ..................... 192/53.341; 74/339
(58) Field of Search .................. 192/53.34, 53.341, 192/53.342, 53.343, 30 V; 74/339

(56) References Cited

U.S. PATENT DOCUMENTS

| | | | | |
|---|---|---|---|---|
| 2,221,893 A | * | 11/1940 | White ..................... | 192/53.342 |
| 3,618,724 A | * | 11/1971 | Oehl ..................... | 192/53.343 |
| 4,566,568 A | * | 1/1986 | Yant ..................... | 192/53.341 |
| 5,085,303 A | * | 2/1992 | Frost .................. | 192/53.341 X |

* cited by examiner

Primary Examiner—Richard M. Lorence
(74) Attorney, Agent, or Firm—Christie, Parker & Hale, LLP

(57) ABSTRACT

A synchronizer for manual transmission constructed and arranged to separate a sleeve moved by a shift fork to an inner sleeve and an outer sleeve to soften a gear shifting feel and to improve a durability of transmission. The synchronizer has a hub gear coupled to a main spindle, a speed gear installed on the main spindle relative to a side surface of the hub gear and formed with a clutch gear on an inner surface thereof relative to the hub gear side and a sleeve coupled to an outer circumference of the hub gear to move toward an axial direction during gear shifting and to be synchronized to the clutch gear. The sleeve includes: an inner sleeve coupled to an outer circumference of the hub gear to move axially during gear shifting and to be meshed to the clutch gear; an outer sleeve positioned at an outer circumference of the inner sleeve and receiving a manipulating power of gear shift from a driver to move axially; and a buffer interlocking unit installed between the inner sleeve and the outer sleeve to make the inner sleeve move along the outer sleeve and to simultaneously function smoothly.

9 Claims, 2 Drawing Sheets

SYNCHRONIZER FOR MANUAL TRANSMISSION

BACKGROUND OF THE INVENTION

1. Field of the Invention

The present invention relates to a synchronizer for manual transmission, and more particularly to a synchronizer for manual transmission constructed and arranged to separate a sleeve axially moved by a shift fork, thereby improving a shift manipulating feel and increasing durability of the transmission.

2. Description of the Prior Art

A synchronizer of a manual transmission serves to synchronize rotating speeds of driving gear and driven gear when both gears are meshed, preventing a shock from gear change by way of soft meshing therebetween.

In the synchronizer for the manual transmission thus described and shown in FIG. 1, when a manipulating force of a shift lever by a driver is supplied to a sleeve 4 via a shift fork 3, the sleeve 4 slides at an external side of a hub gear 2 quipped at a main spindle 1 to move a synchronizer key 8, which, in turn provides pressure to a synchronizer ring 7.

At this time, the synchronizer ring 7 is coupled to a clutch gear 6 of a speed gear 5 via a conical clutch to offset a rotary speed difference between the hub gear 2 and the speed gear 5 for synchronization.

When synchronized as above, the sleeve 4 further moves to be completely meshed with the clutch gear 6, thereby connecting the hub gear 2 and the clutch gear 6 mechanically and completing transfer of gear shifting power.

However, there is a problem in the synchronizer for manual transmission according to the prior art thus described in that a deafening noise and vibration are generated which shortens the life of the transmission if some parts of the components are inferior in quality, abnormally worn down or a driver's manipulation of gear shifting is done abruptly.

There is another problem in that a vibrating sound may be directly transmitted to the driver through the sleeve 4 and the shift fork 3 which decreases the manipulating feel of gear shifting, if those discrepancies mentioned above occur.

SUMMARY OF THE INVENTION

The present invention as disclosed solves the aforementioned problems and it is an object of the present invention to provide a synchronizer for manual transmission constructed and arranged to separate a sleeve moved by a shift fork to an inner sleeve and an outer sleeve to soften a gear shifting feel and to improve durability of the transmission.

In accordance with the objects of the present invention, there is provided a synchronizer for a manual transmission, the synchronizer having a hub gear coupled to a main spindle, a speed gear installed on the main spindle relative to a side surface of the hub gear and formed with a clutch gear on an inner surface thereof relative to the hub gear side and a sleeve coupled to an outer circumference of the hub gear to move toward an axial direction during gear shifting and to be synchronized to the clutch gear, wherein, the sleeve comprises:

an inner sleeve coupled to an outer circumference of the hub gear to move axially during gear shifting and to be meshed to the clutch gear;

an outer sleeve positioned at an outer circumference of the inner sleeve and receiving a manipulating power of gear shift from a driver to move axially; and buffer interlocking means installed between the inner sleeve and the outer sleeve to make the inner sleeve move along the outer sleeve and to simultaneously function smoothly.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 1:
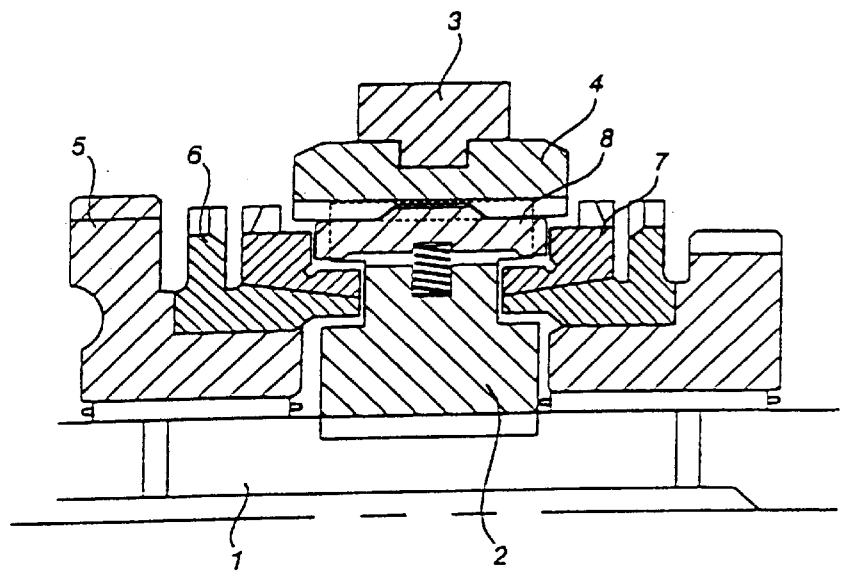
FIG. 1 is a constitutional diagram for illustrating a synchronizer for manual transmission according to the prior art.
Figure 2:
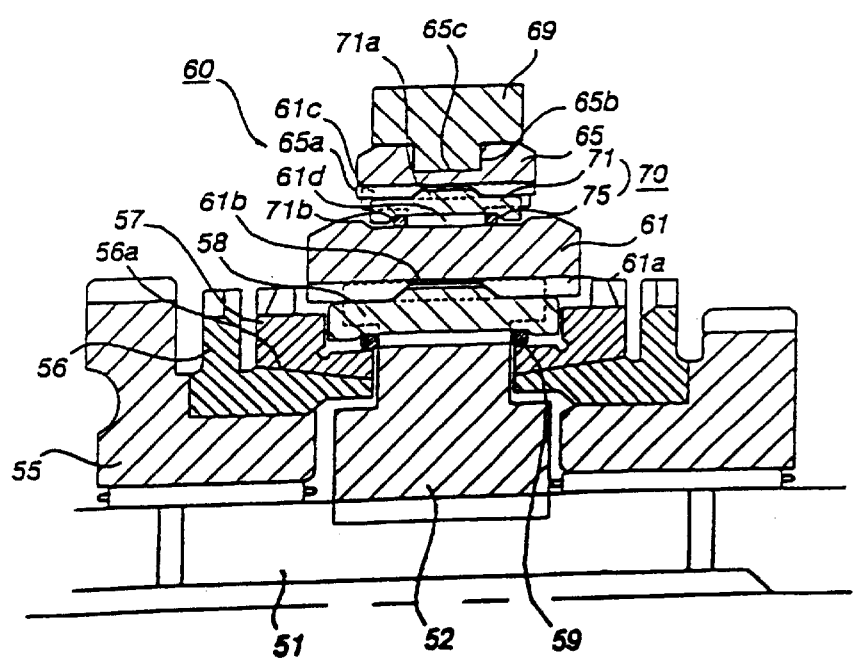
FIG. 2 is a sectional view for illustrating a first embodiment of the present invention.

FIG. 2 is a sectional view illustrating a first embodiment of the present invention where a synchronizer for manual transmission is depicted.

The synchronizer of the first embodiment according to the present invention includes a hub gear 52 splined to a main spindle 51 to thereby be rotated with the main spindle 51, a speed gear 55 mounted on the main spindle 51 relative to a side surface of the hub gear 52 to transmit a transmission power, a clutch gear 56 mounted at a lateral side of the speed gear 55 and formed with a conical part 56a, a sleeve 60 coupled to an outer circumference of the hub gear 52 to move axially, and a synchro-ring 57 disposed between the sleeve 60 and the clutch gear 56 to provide a friction power for start of synchro operation when the sleeve 60 moves.

Furthermore, between the hub gear 52 and the sleeve 60, there is provided a plurality of synchro-keys 58 in order to secure the synchro ring 57 to the conical part 56a of the clutch gear 56 when the sleeve 60 moves, where the synchro keys 58 receive resilient power from a key spring mounted at both sides of the hub key 52 so as to adhere to an inner surface of the sleeve 60.

Particularly, the sleeve 60 includes an inner sleeve 61 splined to the hub gear 52 to move axially when a gear is changed to thereby be meshed to the clutch gear 56, an outer sleeve 65 coupled to an outer circumference of the inner sleeve and for receiving a transmission manipulating force of a driver through a shift fork 69 to allow the inner sleeve 61 to move axially, and a buffer interlocking mechanism 70 mounted between the inner sleeve 61 and the outer sleeve 65 to simultaneously move with a predetermined interval disposed therebetween.

At this location, the inner sleeve 61 is formed at an inner circumference thereof with spline teeth 61a to be meshed with an external side of the hub gear 52 and is also formed with grooves 61b coupled to a back of the synchro key 58.

Furthermore, the inner sleeve 61 is formed at an outer circumference thereof with spline teeth 61c to enable the outer sleeve 65 to move axially and to be coupled thereto. The outer sleeve 65 is formed at an inner circumference thereof with spline teeth 65a to be meshed with outer spline teeth 61c of the inner sleeve 61 and is circumferentially formed at an outer circumference thereof with grooves 65b meshed with shift fork 69.

The buffer-interlocking mechanism 70 includes an interlocking key 71 mounted between the inner sleeve 71 and the outer sleeve 75 for moving together, and a buffer spring 75 for providing a resilient to allow the interlocking key 71 to be adhered to the outer sleeve 65 relative to both sides of the inner sleeve 61.

The interlocking key 71, shaped in a predetermined size of rod-like substance similar to that of the synchro-key 58, is formed thereof with a back 71a protruded in a slow incline in order to join the outer sleeve 65, and is also formed thereunder with a jaw portion 71b for the buffer spring 75 to be accommodated therein.

At this location, the buffer spring 75 is formed to have a stronger resilience than that of the key spring 59 to thereby provide a resilience to the interlocking key 71 such that the inner sleeve 61 can be simultaneously moved when the outer sleeve 65 is axially actuated. A plurality of key grooves 61d are formed at an outer circumference of the inner sleeve 61 to allow the interlocking key 71 to be positioned therein as the buffer interlocking mechanism 70 is provided, while the outer sleeve 65 is formed with groove portion 65c to which the back 71a of the interlocking key 71 is coupled.

Now, the operation of the first embodiment thus constructed will be described.

When a change lever manipulating force of a driver is provided to the outer sleeve 65 through the shift fork 69, the outer sleeve 65 is moved to a speed gear direction, where, the interlocking key 71 which has received a force from the buffer spring 75 is also moved toward the outer sleeve 65 at the same time to thereby supply an axial moving power to the inner sleeve 61.

In other words, the buffer spring 75 mounted in the rear side of advancing direction of the outer sleeve 65 is hitched by the jaw portion 71b of the buffer key 71 to move in the advancing direction of the outer sleeve 65 along with the interlocking key 71, where the buffer spring 75 pushes a lateral surface of the inner sleeve 61 to simultaneously move the outer sleeve 65 along with the inner sleeve 61.

Successively, the outer sleeve 65 slides at an external side of the hub gear 52 mounted at the main spindle 51 along with the inner sleeve 61 to move the synchro key 58, such that the synchro key 58 serves to provide a pressure to the synchro ring 57.

At this time, the synchro ring 57 is coupled to the conical part 56a of the clutch gear 56 to offset a rotating speed difference between the hub gear 52 and the speed gear 55, where a synchronous operation is realized.

When synchronized as above, the inner sleeve 61 is further moved to be completely meshed to the clutch gear 56, such that the hub gear 52 and the clutch gear 56 are mechanically connected to complete the gear shifting. Furthermore, even after the gear change is executed as above and even when the gear is changed into a neutral position, the outer sleeve 65 and the inner sleeve 61 are moved to the neutral position in the same process as above.

Meanwhile, when a driver suddenly manipulates to perform a gear shifting, the inner sleeve 61 is swiftly meshed to the synchro ring 57 and the clutch gear 56 to generate a predetermined degree of repulsive power, where the outer sleeve 65 is actuated with the inner sleeve 61 via the buffer interlocking mechanism 70 and a relatively small-displacement is generated simultaneously. Successively, the interlocking key 71 is inserted into the groove portion 65c of the outer sleeve 65 by the resilience of the buffer spring 75 to find a normal position, such that the small displacement between the outer sleeve 65 and the inner sleeve 61 restores the formed original state.

Accordingly, even if the driver manipulates or shifts the change lever suddenly, the repulsive force generated therefrom is to some degree absorbed by a relatively small motion between the outer sleeve 65 and the inner sleeve 61 and shock absorbing power of the buffer spring 75, such that the shift manipulating feel transmitted to the driver is much improved.

Furthermore, an operating force of the shift fork 69 is transmitted to the inner sleeve 61 via the outer sleeve 65 and the buffer interlocking mechanism 70 when the inner sleeve 61 is meshed into or unmeshed from the synchro ring 57, clutch gear 56 or the like during the gear shifting or shifting to a neutral position, thereby enabling a softer shifting operation, such that collision among respective parts can be alleviated to reduce generation of abrasion at the synchronizer.

Figure 3:
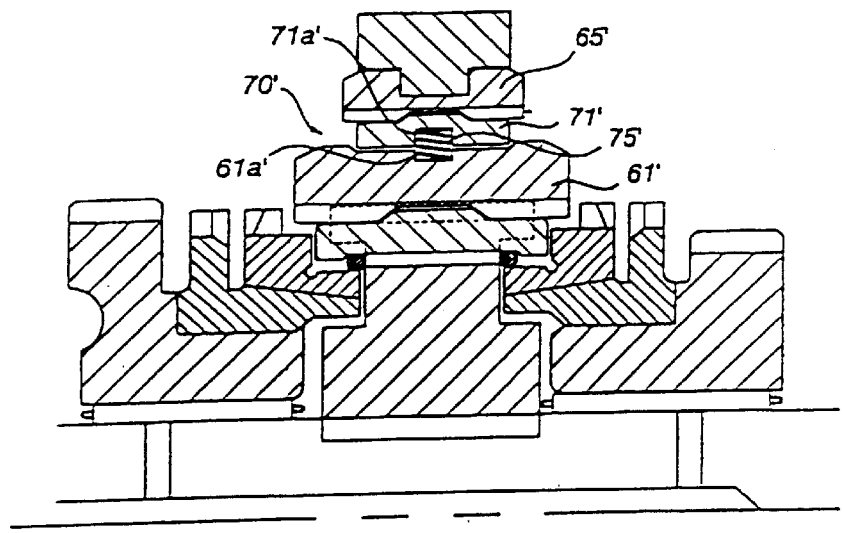
FIG. 3 is a sectional view for illustrating a second embodiment of the present invention.

FIG. 3 is a sectional view illustrating a second embodiment of the present invention where a synchronizer for manual transmission is depicted.

The synchronizer according to the second embodiment of the present invention is different from the first embodiment in terms of construction of buffer interlocking mechanism 70'.

The buffer spring 75 for providing a resilience to the interlocking key 71 in the first embodiment of the present invention is a ring-shaped spring mounted on both sides of the inner sleeve 61 while in the second embodiment, an interlocking key 71' is so constructed as to be supported by a coil spring 75'. A plurality of grooves 61a' and 71a' are formed such that the coil spring 75' is insertedly mounted at an outer circumference of an inner sleeve 61' and an inner surface of the interlocking key 71'. The interlocking key 71' secured to an inner circumferential surface of the outer sleeve 65' receives a resilient force from the coil spring 75' mounted at the groove 61a' of the inner sleeve 61'. The interlocking key 71' and the coil spring 75' therefore serve as buffers as described in the operation of the first embodiment when a gear is shifted or transmitted to a neutral position.

Figure 4:
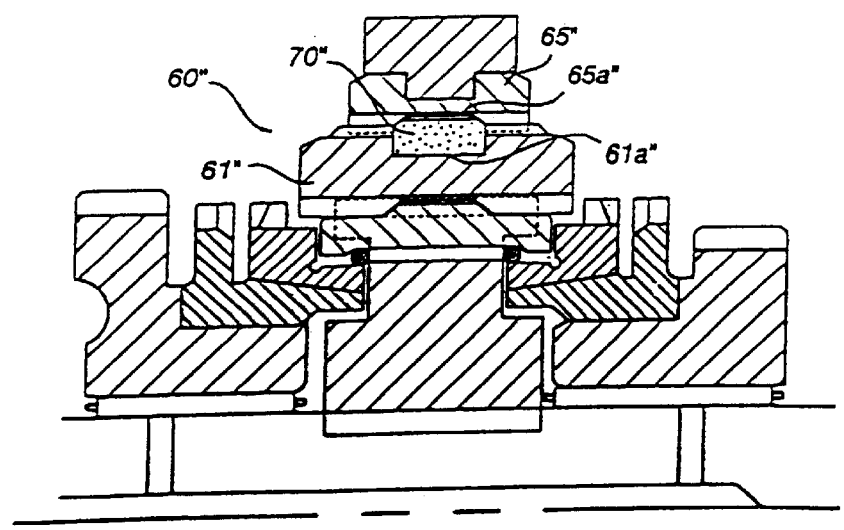
FIG. 4 is a sectional view for illustrating a third embodiment of the present invention.

FIG. 4 is a sectional view for illustrating a third embodiment according to the present invention where a synchronizer for a manual transmission is shown.

A buffer interlocking mechanism 70" according to the third embodiment of the present invention includes an resilient member of rubber installed between an inner sleeve 61" and an outer sleeve 65". In other words, the buffer interlocking mechanism 70", shaped in a rubber key shape, is mounted in plural numbers between the inner sleeve 61" and the outer sleeve 65", to alleviate shock possibly generated from the sleeve 60" in moving.

At this location, the buffer interlocking mechanism 70" made of a rubber resilient member may be constructed to be attached at inner and outer parts thereof to the inner sleeve 61" and the outer sleeve 65", and may be also constructed to be inserted into grooves 61a" and 65a" formed at the inner sleeve 61" and the outer sleeve 65".

Although the invention has been described in detail with reference to its presently preferred embodiments about a synchronizer of single cone method comprising one synchro ring, various synchronizers having different constructions for actuation of synchronous operation and gear shifting along an axial direction of sleeve can be easily embodied.

In other words, the present invention can be easily applied to a synchronizer of double cone method where two synchro rings (inner ring and outer ring) are mounted and to a synchronizer of keyless method where no synchro key is provided.

As apparent from the foregoing, there is an advantage in the synchronizer for manual transmission according to the present invention thus constructed and operated in that a sleeve is divided into an inner sleeve and an outer sleeve while a buffer interlocking mechanism is mounted therebetween, such that collision among component parts can be alleviated during change of gear lever or gear shifting to a neutral position to thereby improve durability of parts.

There is another advantage in that an alleviated state of shock is transmitted to a driver through a buffer interlocking mechanism and an outer sleeve even if a sudden manipulation or sudden shifting of change lever is performed by the driver, thereby providing an improved change lever manipulating feel.

What is claimed is:

1. A synchronizer for manual transmission, the synchronizer having a hub gear coupled to a main spindle, a speed gear installed on the main spindle relative to a side surface of the hub gear and formed with a clutch gear on an inner surface thereof relative to the hub gear side and a sleeve coupled to an outer circumference of the hub gear to move toward axial direction during gear shifting and to be synchronized to the clutch gear, wherein, the sleeve comprises:

an inner sleeve coupled to an outer circumference of the hub gear to move axially during gear shifting and to be meshed to the clutch gear;

an outer sleeve positioned at an outer circumference of the inner sleeve and receiving a manipulating power of gear shift from a driver to move axially; and buffer interlocking means installed between the inner sleeve and the outer sleeve to make the inner sleeve move along the outer sleeve and to simultaneously function smoothly.

2. The synchronizer as defined in claim 1, wherein the inner sleeve and the outer sleeve are spline-coupled for relative axial movement and respectively formed with a plurality of key grooves and groove portions, while the buffer interlocking means comprises:

an interlocking key inserted into the key grooves of the inner sleeve to adhere to the groove units of the outer sleeve; and a buffer spring for pushing the interlocking key toward the outer sleeve direction from both sides of the inner sleeve.

3. The synchronizer as defined in claim 2, wherein the buffer spring is ring-shaped.

4. The synchronizer as defined in claim 2 or 3, wherein the interlocking key is formed thereon with a back protruder for accommodation into the groove portions of the outer sleeve and is formed at both inner ends thereof with a jaw portion for the buffer spring to be hitched thereon.

5. The synchronizer as defined in claim 1, wherein the inner sleeve and the outer sleeve are spline-coupled for relative axial movement and are respectively formed with a plurality of key grooves and groove portions, while the buffer interlocking means comprises:

an interlocking key inserted into the key grooves to be coupled to the groove portions of the outer sleeve; and resilient means mounted between the inner sleeve and the interlocking key to push the interlocking key toward the outer sleeve.

6. The synchronizer as defined in claim 5, wherein the resilient means is a coil spring while grooves are formed at the inner sleeve and the interlocking key for both ends of the coil spring to be inserted thereto.

7. The synchronizer as defined in claim 1, wherein the inner sleeve and the outer sleeve are coupled for relative axial movement and are respectively formed at mutually coupled surface thereof with a plurality of key grooves and groove portions, while the buffer interlocking means is a rubber resilient member, upper and lower parts of which are respectively inserted into key grooves of the inner sleeve and the groove portions of the outer sleeve.

8. The synchronizer as defined in claim 7, wherein the rubber resilient member is fixed thereunder to key grooves of the inner sleeve, and is inserted into groove portions of the outer sleeve for enabling a fine relative movement.

9. A synchronizer for manual transmission, the synchronizer having a hub gear coupled to a main spindle, a speed gear installed on the main spindle relative to a side surface of the hub gear and formed with a clutch gear on an inner surface thereof relative to the hub gear side and a sleeve coupled to an outer circumference of the hub gear to move toward axial direction during gear shifting and to be synchronized to the clutch gear, wherein, the sleeve comprises:

an inner sleeve coupled to an outer circumference of the hub gear to move axially during gear shifting and to be meshed to the clutch gear;

an outer sleeve positioned at an outer circumference of the inner sleeve and receiving a manipulating power of gear shift from a driver to move axially, the inner sleeve and the outer sleeve being spline-coupled for relative axial movement and respectively formed with a plurality of key grooves and groove portions; and a buffer interlocker installed between the inner sleeve and the outer sleeve to make the inner sleeve move along the outer sleeve and to simultaneously function smoothly, the buffer interlocker comprising an interlocking key inserted into the key grooves of the inner sleeve to adhere to the groove units of the outer sleeve, and a buffer spring for pushing the interlocking key toward the outer sleeve direction from both sides of the inner sleeve.

* * * * *